US012789637B2

(12) United States Patent
Sengodan et al.

(10) Patent No.: US 12,789,637 B2
(45) Date of Patent: Nov. 10, 2026

(54) COLD START INDUCTION HEATING AND BRAKING ARRANGEMENT

(71) Applicant: Hamilton Sundstrand Corporation, Charlotte, NC (US)

(72) Inventors: Rajkumar Sengodan, Namakkal (IN); Thilak Raj Durairaj, Shirley (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 342 days.

(21) Appl. No.: 18/627,648

(22) Filed: Apr. 5, 2024

(65) Prior Publication Data

US 2025/0121696 A1 Apr. 17, 2025

(30) Foreign Application Priority Data

Oct. 11, 2023 (IN) ............................. 202311068349

(51) Int. Cl.
*B60L 7/18* (2006.01)
*B60L 7/12* (2006.01)

(52) U.S. Cl.
CPC .................... *B60L 7/18* (2013.01); *B60L 7/12* (2013.01); *B60L 2200/10* (2013.01); *B60L 2220/20* (2013.01)

(58) Field of Classification Search
CPC .......... B60L 7/18; B60L 7/12; B60L 2200/10; B60L 2220/20; H02P 3/22; H02P 13/00
See application file for complete search history.

(56) References Cited

U.S. PATENT DOCUMENTS

| | | | | |
|---|---|---|---|---|
| 6,078,156 | A * | 6/2000 | Spurr | H02P 3/08 318/368 |
| 7,075,257 | B2 | 7/2006 | Carrier et al. | |
| 7,733,615 | B2 | 6/2010 | Eschleman et al. | |
| 9,178,448 | B2 | 11/2015 | Ogawa | |
| 11,142,075 | B2 | 10/2021 | Sengodan | |
| 11,171,580 | B2 | 11/2021 | Duerr et al. | |
| 11,199,039 | B2 | 12/2021 | Zander et al. | |

(Continued)

FOREIGN PATENT DOCUMENTS

| | | | |
|---|---|---|---|
| CN | 207720049 | U | 8/2018 |
| EP | 1650860 | A1 | 4/2006 |

(Continued)

OTHER PUBLICATIONS

European Search Report for Application No. 24205982.2, mailed Feb. 6, 2025, 10 pages.
Abstract for CN207720049 (U), Published: Aug. 10, 2018, 1 page.

*Primary Examiner* — Bickey Dhakal
(74) *Attorney, Agent, or Firm* — CANTOR COLBURN LLP

(57) ABSTRACT

A drive system for an aircraft. The drive system includes a controller, a motor coupled to an H-bridge network, a DC link that can be coupled to the motor; and an electrical braking system configured to be electrically coupled to the motor. The electrical braking system includes: a sense circuit configured to sense a condition of the DC link; a brake resistor coupled to the DC link; a temperature sensor; a drive circuit coupled to the sense circuit; and a coil for breaking in an inductive braking mode or generating heat in a cold start mode, wherein the coil is located in or near a line replaceable unit chassis that includes printed circuit boards.

19 Claims, 6 Drawing Sheets

(56) References Cited

U.S. PATENT DOCUMENTS

| | | | | |
|---|---|---|---|---|
| 11,695,352 | B2 | 7/2023 | Westerby et al. | |
| 2014/0300298 | A1* | 10/2014 | Liu | H02P 27/14 318/380 |
| 2014/0355212 | A1 | 12/2014 | Campbell et al. | |
| 2016/0047604 | A1* | 2/2016 | Engelhardt | F28D 15/0275 165/104.21 |
| 2019/0120196 | A1* | 4/2019 | Santoro | F02D 41/064 |
| 2019/0215951 | A1 | 7/2019 | Severson et al. | |
| 2020/0044482 | A1 | 2/2020 | Partovi et al. | |
| 2021/0039499 | A1* | 2/2021 | Sengodan | B60L 7/22 |
| 2021/0194393 | A1 | 6/2021 | Rose et al. | |
| 2023/0144377 | A1 | 5/2023 | Adamopoulos et al. | |

FOREIGN PATENT DOCUMENTS

| | | | | |
|---|---|---|---|---|
| EP | 3789231 | A1 | 3/2021 | |
| JP | 2014138532 | A | 7/2014 | |
| KR | 102337700 | B1 * | 12/2021 | H02P 27/08 |

* cited by examiner

COLD START INDUCTION HEATING AND BRAKING ARRANGEMENT

CROSS REFERENCE TO RELATED APPLICATION

This application claims the benefit of Indian Patent Application number 202311068349 filed Oct. 11, 2023, the disclosure of which is incorporated herein by reference in its entirety.

BACKGROUND

The present invention generally relates to electrical systems, and more specifically to a system and method for operating an efficient inductive electrical braking system that can heat.

During cold start, electronic components and integrated circuits (ICs) tend to draw more current at low temperatures. Since more current becomes more heat, this can increase thermal cycling. Digital circuits have special timing rules to ensure that all signals are in the right place at the right time. Lowering the temperature changes all that and can create a race condition. Thus, during a cold start, it may be beneficial to heat the IC's so they operate correctly.

BRIEF DESCRIPTION

In one embodiment, a drive system for an aircraft is disclosed. The drive system includes a controller, a motor coupled configured to be driven by an H-bridge network, a DC link that can be coupled to the motor; and an electrical braking system configured to be electrically coupled to the motor. The electrical braking system includes: a sense circuit configured to sense a condition of the DC link; a brake resistor coupled to the DC link; a temperature sensor; a drive circuit coupled to the sense circuit; and a coil for breaking in an inductive braking mode or generating heat in a cold start mode, wherein the coil is located in or near a line replaceable unit chassis that includes printed circuit boards.

In addition to one or more of the features described above, or as an alternative to any of the foregoing embodiments, the electrical braking system can be configured to: operate in a pulsed mode, wherein when in the pulsed mode a switch that is parallel with the brake resistor is switched OFF; and control a first brake drive switch based on a configurable duty cycle.

In addition to one or more of the features described above, or as an alternative to any of the foregoing embodiments, the electrical braking system can be configured to operate in the inductive braking mode, wherein when in the inductive braking mode a switch that is parallel to the brake resistor is switched ON and wherein system can further include a first brake drive switch and a second brake drive switch that are driven in a sequential fashion which allows current to flow to the coil.

In addition to one or more of the features described above, or as an alternative to any of the foregoing embodiments, the electrical braking system can be configured to operate in the cold start mode when a temperature measured by the temperature sensor is below a threshold, wherein when in the cold start mode a switch that is parallel to the brake resistor is switched ON and wherein the system further includes a first brake drive switch and a second brake drive switch that are driven in a sequential fashion which allows current to flow to the coil and wherein the motor is decoupled from the DC link.

In addition to one or more of the features described above, or as an alternative to any of the foregoing embodiments, the printed circuit boards include a controller for the motor.

In addition to one or more of the features described above, or as an alternative to any of the foregoing embodiments, the electrical braking system can be configured to: operate in a combination pulsed braking and inductive braking mode; switch a switch parallel to the brake resistor OFF; and switch a first brake drive switch according to a configurable duty cycle to allow for pulsed braking and resonance regeneration.

In addition to one or more of the features described above, or as an alternative to any of the foregoing embodiments, the sensed condition is a DC link voltage.

In addition to one or more of the features described above, or as an alternative to any of the foregoing embodiments, the controller can be configured to provide control signals including a pulse width modulation (PWM) signal.

In addition to one or more of the features described above, or as an alternative to any of the foregoing embodiments, the sense circuit can include a Zener diode configuration.

In addition to one or more of the features described above, or as an alternative to any of the foregoing embodiments, the electrical braking system can be configured in a star connected configuration.

In addition to one or more of the features described above, or as an alternative to any of the foregoing embodiments, the coil or the phase coils can be disposed between two plates. The two plates can be formed of a ferrous material.

Also disclosed is a method of operating a system as recited in any prior embodiment. In this method, the system includes a first brake drive switch and a second brake drive switch and the method can comprise: causing the electrical braking system to operate in the cold start mode when a temperature measured by the temperature sensor is below a threshold, wherein when in the cold start mode a switch that is parallel to the brake resistor is switched ON; and driving the first brake drive switch and the second brake drive switch in a sequential fashion to allow current to flow to the coil; and decoupling the motor from the DC link when operating in the cold start mode.

In addition to one or more of the features described above, or as an alternative to any of the foregoing method embodiments, the method can further include: coupling the motor from the DC link; causing the electrical braking system to operate in a pulsed mode, wherein when in the pulsed mode the switch that is parallel with the brake resistor is switched OFF; and controlling the first brake drive switch based on a configurable duty cycle.

In addition to one or more of the features described above, or as an alternative to any of the foregoing method embodiments, the method can further include: coupling the motor from the DC link; causing the electrical braking system to operate in the inductive braking mode, wherein when in the inductive braking mode the switch that is parallel to the brake resistor is switched ON; and driving the first brake drive switch and the second brake drive switch in a sequential fashion to allow current to flow to the coil.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
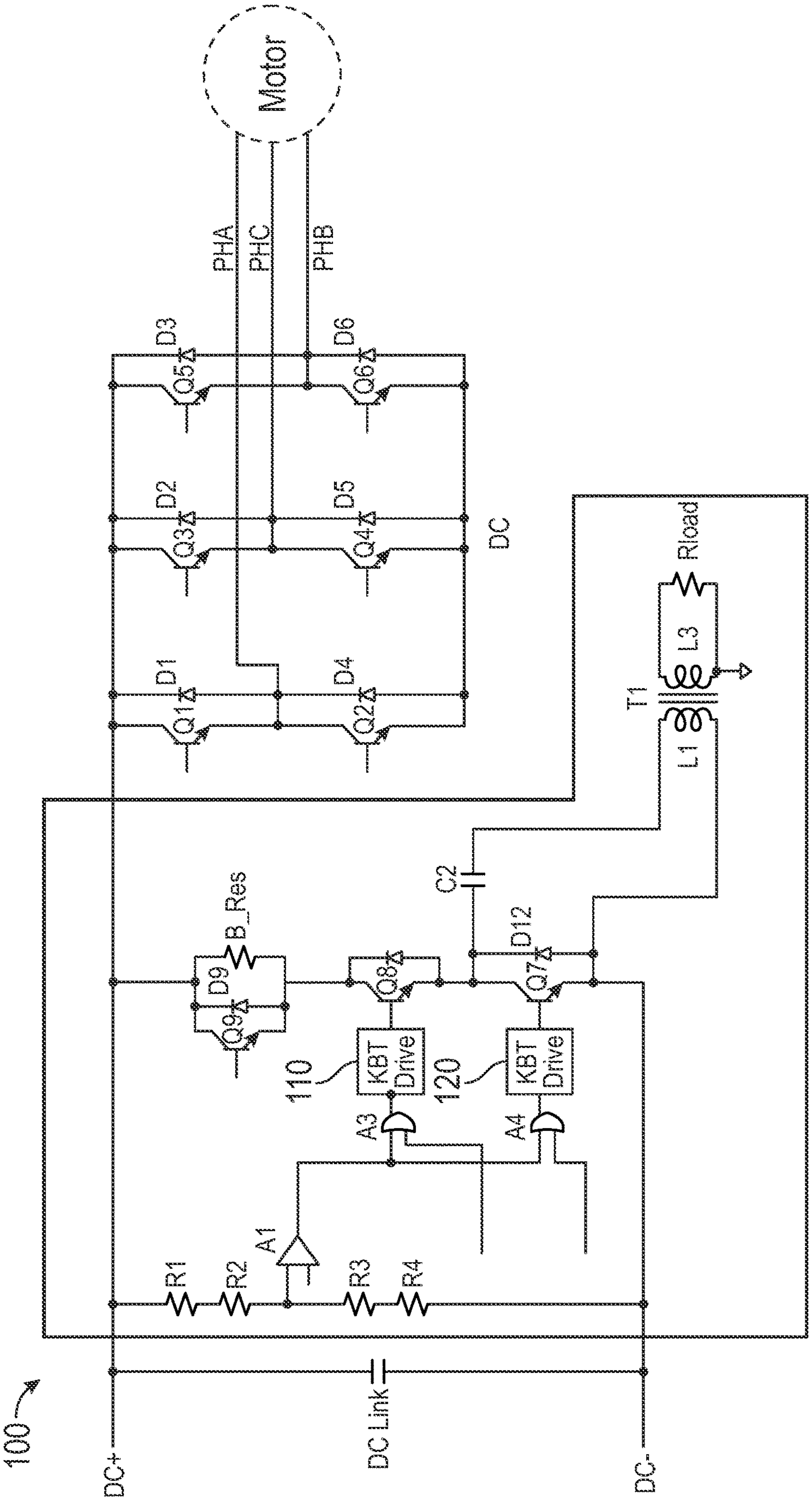
FIG. 1 depicts an arrangement of the electrical braking system with cold start heating using top/bottom brake IGBT in accordance with one or more embodiments.

The braking of a motor in an electric drive is typically accomplished by closing brake contacts across the motor windings after the trigger of the switch that couples power to the motor windings is opened. This conventional technique results in very high currents during braking with increased size of brake resistors and power dissipated as heat with no regeneration. Further, it results in sudden braking, which can be detrimental to the life of the motor system. Also, as noted above, certain IC's or other electrical components may not operate properly when cold.

The techniques described herein are capable of minimizing the size of the brake resistor and power dissipation in the brake resistor during the braking operation. In addition, the circuit can be operated in a heating mode where heat generated due to inductive braking can be used to warm up IC's.

At present the back emf is dissipated as heat in brake resistor on chassis sidewalls and the proposed technique will transform the power dissipation to induction heating which in-turn reduces the size of braking resistor and in-addition increases the efficiency of the system at cold-start.

According to aerospace power quality specifications, the regenerative power must be dissipated in the drive itself to avoid instability problem in the aircraft power supply. The regenerative braking system drives a motor by using the kinetic energy and charges a battery/DC link capacitor with electric energy generated from the motor in order to improve the efficiency of the electric drive, so that the regenerative braking system improves the fuel consumption ratio. In order to maximize the charge rate of a battery by converting kinetic energy into electric energy through the regenerative braking of the motor during the braking operation, an active-control braking device capable of reducing braking force corresponding to the regenerative braking torque is necessary.

Conventional techniques dissipate the back EMF as heat in the brake resistor. The techniques described herein will transform the dissipated power to regenerative power which in turn reduces the multifold the size of the braking resistor increase the efficiency of the system. The power being dissipated can be used to inductively heat a plate or other metal object to warm ICs during start up. Reference will now be made to FIGS. 1-4 to show different embodiments of an induction breaking system that includes at least one inductor (e.g., L1/L3) that can be used to create heat. As further described below, L3/Load can be implanted as one or more (e.g., 2) plates that surround the L1. In such a case, current through L1 will generate heat in the plates (inductive heating) to heat at start up. Further, the configuration can be used in combination with a brake resistor.

In one embodiment, the electrical braking system technique can minimize size and power dissipation in brake resistor during the braking operation while improving responsiveness and control performance by executing braking operation using a pulse braking mode, an induction braking mode, a combination of the pulse and breaking modes and an induction heating mode during cold start.

In one embodiment, induction heating/braking by means of ferrous plate assembly is disclosed. The braking circuit is feed with back EMF generated by the motor when power is disconnected from the motor. At present the back emf is dissipated as heat in brake resistor on chassis sidewalls and the proposed technique will transform the power dissipation to induction heating which in-turn reduce multifold the size of braking resistor and in-addition increases the efficiency of the system at cold-start.

In one embodiment, the circuit can utilize a pulsed braking resistor and inductive braking. In the cold mode, two ferrous plates that surround inductor L1 will get warm and, thus, can heat adjacent IC's during start up. In such a case, power can be provide by a source other than the motor if desired.

The size (e.g., width) of the coil/plate configuration can be thinner than existing brake resistors. As such, the teachings herein can provide lighter weight with novel braking scheme and a smaller size brake resistor is sufficient compared to existing braking topology.

The plate/coils can be integrated via slotted back plane provision for thermal dissipation or mounted onto side walls of a line replaceable unit (LRU). Further the proposed stack-up can be segregated to different fitment regions in LRU based on heatsink availability and thermal profile. As will be understood, having the coil sandwiched between two ferrous plates that act as a faraday cage can shield nearby elements from the internally generated EMI.

As shown below, the systems can have at least four modes: motor braking along with brake resistor; motor braking independent of brake resistor (full induction braking); a combination of resistive and inductive breaking; and a cold start mode where the induction braking coil (inductor) can utilize LRU voltage (115V/230V), to heat-up the circuit cards integrated via back plane thermal dissipation.

When operating in the pulse braking mode, the brake resistor is turned ON for a longer duration when compared to operating in the inductive mode. In one or more embodiments, the duty cycle for one or more switching transistors is configured to allow for faster braking. Therefore, the brake resistor will engage motor brake fast enough to stop the mechanical movement. The duty cycle can be configured according to the desired braking method. The pulse braking method aids in stopping further rotor movement.

During inductive braking mode according to the embodiments described herein, the switching transistors are turned ON in a sequential fashion. This mode provides breaking by sequentially causing power to pass through the inductor an applies induction braking by transform action. In this manner power from the excess back EMF generated above the DC LINK upper threshold voltage can be dissipated. This energy can be utilized for driving auxiliary loads in the system. In another example, the energy can be stored in an energy storage device such as a battery. The techniques described herein also provide for operating the electrical braking system in a combined mode including the inductive braking and pulse braking.

FIG. 1 depicts a circuit for electrical braking system 100 in accordance with one or more embodiments. FIG. 1 depicts a motor and an H-bridge circuit including switches Q1, Q2, Q3, Q4, Q5, Q6, and diodes D1, D2, D3, D4, D5, D6. In one or more embodiments, the motor is a brushless DC motor. In other embodiments a brushed motor can be used. It should be understood the techniques described herein can also be applied to alternating current (AC) motors as well. The diodes D1-D6 are connected across the corresponding switches Q1-Q6. Also, the H-bridge circuit is coupled to a switching logic (not shown) to control the output of the H-bridge circuit. In addition, FIG. 1 depicts a comparator A1, logic devices (OR gates) A3, A4, a brake resistor B_Res connected in parallel with the switch Q9 and the diode D9. Also shown in FIG. 1 are brake switches Q7, Q8 with corresponding diodes D12, D11 arranged across the brake switches Q7, Q8. The brake switches Q7, Q8 are controlled by the brake drives 110, 120. The coil T1 is coupled across the brake switch Q7 and is configured to perform inductive braking.

In a non-limiting example, during nominal operating conditions the DC link can hold-up to 270 Vdc to operate the load drive. Under braking conditions, the back EMF generated by the motor charges the DC link capacitor to the upper threshold voltage. In one embodiment, the upper threshold is 380 V. It should be understood the upper threshold can be selected based on a particular application. Once the DC link capacitor charge exceeds the upper threshold the brake resistor B_Res is turned ON to dissipate the excess energy as heat. That is, the switch Q9 is switch OFF to allow the brake resistor to dissipate the excess energy. The upper voltage threshold sense circuit includes a series of thick film resistors R1, R2, R3, R4 that provide the sensed DC link voltage to the non-inverting terminal of the comparator A1.

The inverting terminal of the comparator A1 is provided with a reference voltage (Vref) which is used to compare the sensed voltage to determine whether an upper threshold has been exceeded. Logic devices A3, A4 (OR gates) are coupled to the comparator and receive input from the comparator A1 and switching logic (not shown). The output of the logic devices A3, A4 are provided to the brake drives 110, 120 to control the switches Q7, Q8, respectively. In one embodiment, the logic devices A3, A4 trigger the brake drives 110, 120 when it receives logic HIGH signal. It is to be noted that the comparator A1 will overdrive the brake drives 110, 120 if the DC link voltage reaches the upper threshold value during back EMF generation and comparator A1 is implemented for the DC link protection function.

When the system 100 operates in the pulse braking mode, the brake resistor B_Res is turned ON for a longer duration when compared to the regenerative mode. In a non-limiting example, the duty cycle for the switch Q7 is configured with a ton (switch/transistor ON duty cycle)>50%, switch Q8 is ON and switch Q9 is in the OFF state. Therefore, the brake resistor (B_Res) will engage the motor brake fast enough to stop the mechanical movement. The duty cycle can be configured as per the braking method. For example, the ton=100% or ton=80% and toff=20%. During a permanent motor stall, the pulse braking method aids in stopping the rotor movement of the braking system.

When operating in the inductive braking mode, the operation can be carried out with the inductive braking by turning ON switches Q8 and Q7 sequentially. That is, switches Q8, Q7 are switched 180 degrees out of phase (ton and toff duty cycle can be varied for the desired braking response). The switch Q9 is turned ON to provide lossless power in the brake resistor B_Res for efficient inductive braking.

If the switch Q8 is configured with a duty cycle=50% and the switch Q7 is configured with a duty cycle=50%, where each switch operates 180 degrees out-of-phase with each other the switches are effectively operated sequentially and provides a current to the coil T1. The energy is, thus, dissipated in resistor Rload.

The brake resistor B_Res is in series with LC which limits the amount of current flowing to the LC circuit of the coil T1. For fast braking, turning ON switch Q7 during the conduction state of switch Q8 enables sequential resistive braking (i.e., switch Q8 duty cycle=50% and the switch Q7 duty cycle=70%). It should be understood that this is not intended to limit the scope and the duty cycles for the switches Q7, Q8 can be modified to provide faster braking or slower braking based on the desired application.

In the combination mode where the system 100 operates in both the inductive braking mode and the pulse braking mode, the switch Q7 is configured to switch with a duty cycle set to ton=50% and toff=50%, the switch Q8 is ON and the switch Q9 is OFF. With the switch Q9 switched OFF, the current is allowed to flow through the braking resistor B_Res. It should be understood the ton and toff duty cycle can be varied for the desired braking response. The LC series resonance of the coil T1 is limited to the maximum current capability and in such case the resistive braking is deployed sequentially to the LC circuit for efficient braking within a short duration. The brake resistor B_Res is in series with LC circuit (L1/C2) of the coil T1 which limits the amount of current flow in the LC circuit. During the ton duty cycle for switch Q7 the pulse braking mode is activated and during the toff cycle the brake energy will flow through the LC circuit (L1, C2) of the coil T1.

The combination mode will engage the motor brake dynamically (i.e., inductive braking and resistive pulse braking) to stop the mechanical movement. As explained below, the circuit 100 of FIG. 1 can also be operated in a cold start mode.

Figure 2:
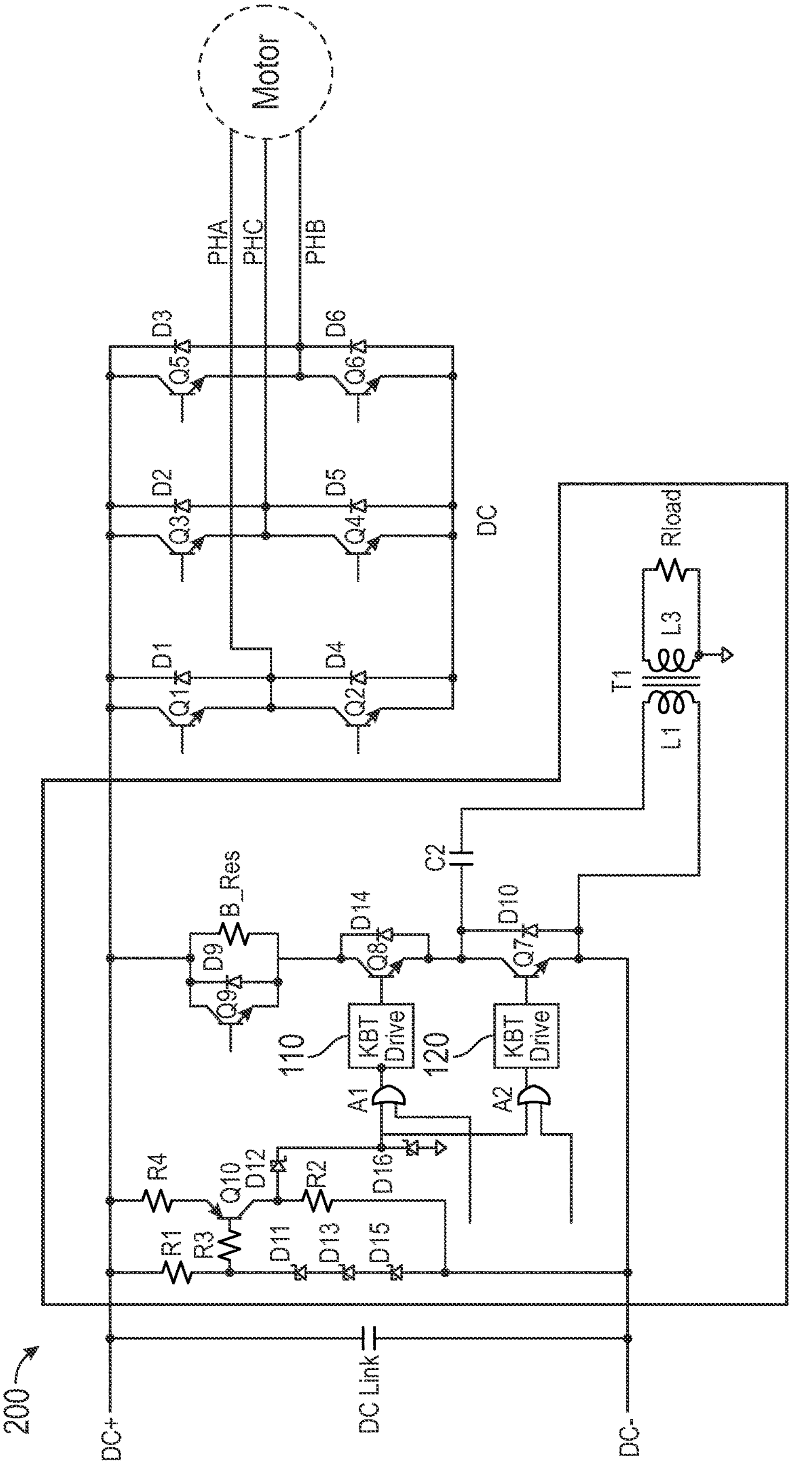
FIG. 2 depicts a different arrangement of the electrical braking system with cold start heating using a Zener upper threshold detection circuit in accordance with one or more embodiments.

Now referring to FIG. 2 an alternative arrangement for an electrical braking system 200 in accordance with one or more embodiments is shown. The system 200 includes similar components as that shown in FIG. 1 including the motor, H-bridge circuit having switches Q1-Q6 and diodes D1-D6, the DC link, brake resistor B_Res, switch Q9, brake drives 110, 120 and switches Q7, Q8, and coil T1.

In addition, the system 200 includes the resistors R1, R2, R3, R4 which provide a bias to switch Q10 (e.g., PNP transistor) and the Zener diodes D11, D13, D15 are configured to turn ON once the back EMF voltage goes above an upper threshold, i.e., 380 V. The resistor R1 limits the current for Zener diode conduction. The switch Q8 will turn ON once Zener breakdown occurs, and the voltage across the resistor R2 provides a logic HIGH to logic devices A1, A2. The diode D16 protects the logic devices A1, A2 from over-voltage during operation. It should be understood that the system 200 can operate in the modes including the pulsed braking mode, the inductive breaking mode, and the combination mode as described with reference to FIG. 1. Further, the system 200 can operate in a cold start mode.

Figure 3:
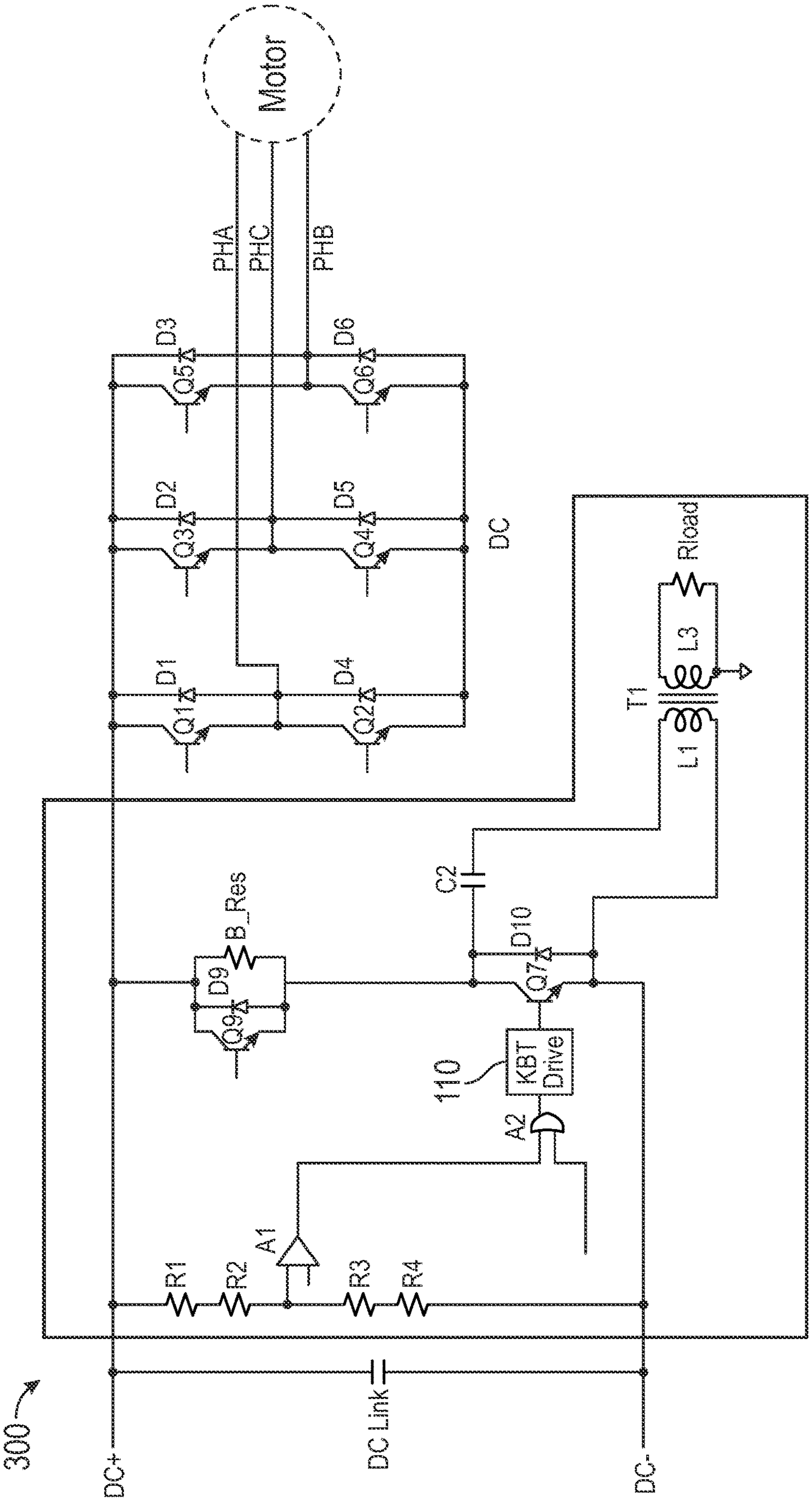
FIG. 3 depicts another arrangement of the electrical braking system with cold start heating with a single brake IGBT in accordance with one or more embodiments.

FIG. 3 depicts another arrangement for an electrical braking system 300 in accordance with one or more embodiments. The system 300 includes similar components as that shown in FIG. 1 including the motor, H-bridge circuit having switches Q1-Q6 and diodes D1-D6, the DC link, brake resistor B_Res, switch Q9, brake drive 110 and switch Q7, and coil T1. In the system 300, the upper voltage threshold of the sense circuit includes a series of resistors R1, R2, R3, R4 and provides the DC link voltage sense signal to the non-inverting terminal of the comparator A1 for the brake drive 110. The logic device A2 will trigger the brake drive 110 when it receives a logic HIGH signal. It is to be noted that the comparator A1 will overdrive the brake drive 110 in the event the DC link voltage reaches the worst case value during the back EMF generation. The comparator A1 is implemented for the DC link protection function.

It should be understood that the system 300 can operate in the modes including the pulsed braking mode, the inductive braking mode, and the combination mode as described with reference to FIG. 1. In the pulsed braking mode, the switch Q8 is switched OFF allowing the current to flow through brake resistor B_Res and the braking is controlled by the duty cycle ton for Q7 is set to ton>50%. When operating in the inductive braking mode, the switch Q8 is switched ON and the duty cycle for switch Q7 can be set to ton=50% to provide the current to the coil T1 to perform the regeneration. Finally, when operating in the combined mode, the switch Q8 is switched OFF and the duty cycle ton for switch Q7 can be set to allow for a sufficient amount of current to flow to the coil. Further, the system 300 can operate in a cold start mode.

Figure 4:
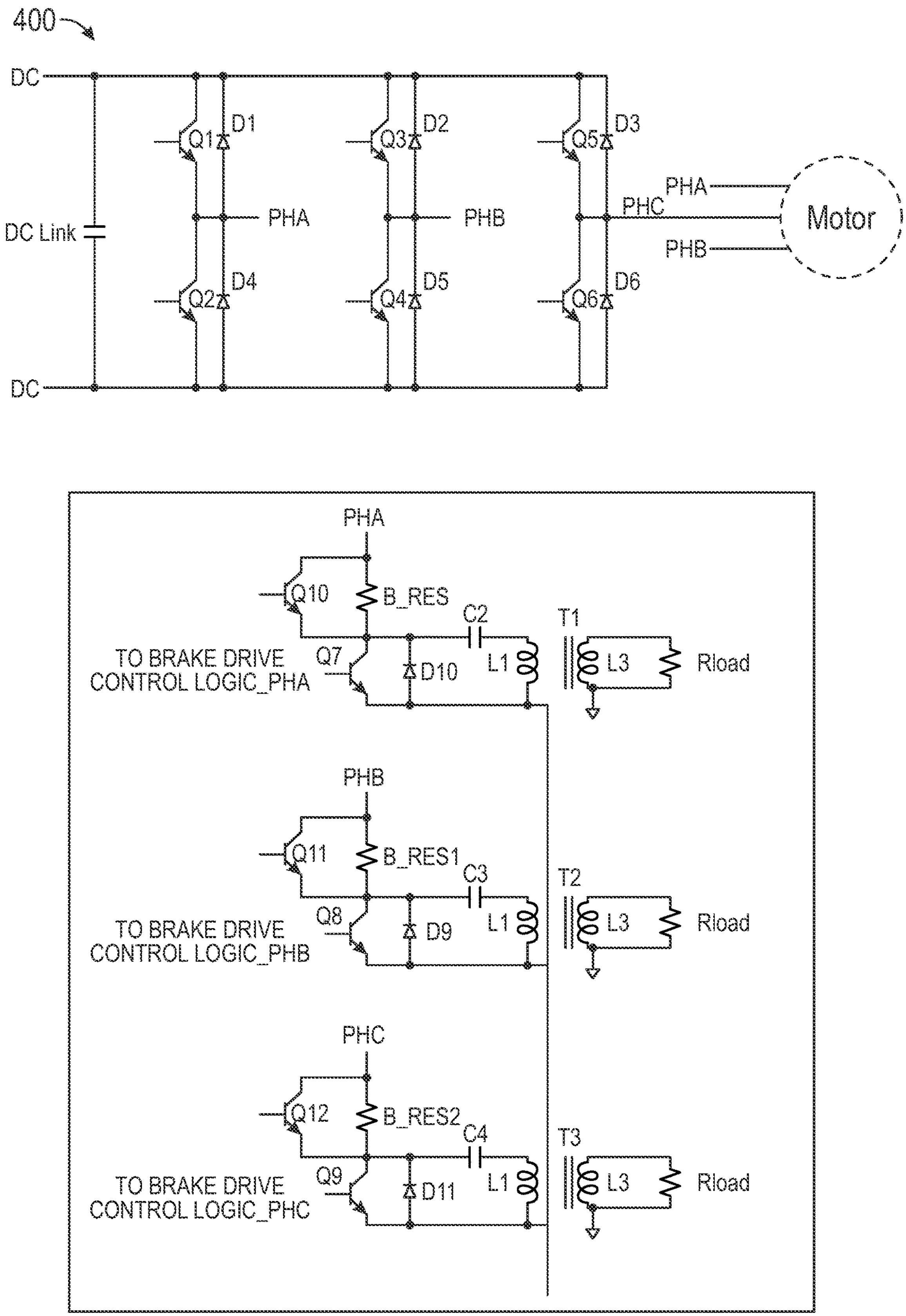
FIG. 4 depicts an arrangement for electrical braking system with cold start heating with star connected brake drives in accordance with one or more embodiments.

FIG. 4 depicts an arrangement for an electrical braking system 400 with a star connected brake drive in accordance with one or more embodiments. The system 400 includes a motor, DC link, and an H-bridge circuit having switches Q1-Q6 and diodes D1-D6. The system 400 also includes brake drive switches Q7, Q8, Q9, brake resistors B_Res, B_Res1, B_Res2, and induction coils T1, T2, T3 for each respective phase of the motor, respectively. This configuration provides individual phase control and pulsed brake loading/inductive brake loading during back EMF action. It should be understood that the system 400 can operate in the modes including the pulsed braking mode, the inductive braking mode, and the combination mode as described with reference to FIG. 1 as well as the cold start mode disclosed below.

In an example, during a pulsed mode the switch Q10 can be switched OFF allowing current to flow through the braking resistor B_Res to dissipate the heat and the duty cycle for switch Q7 is set to ton>50%. When operating in a inductive mode, the switch Q10 is switched ON and the switch Q7 is set to a duty cycle of ton=50% to allow the coil T1 to perform the regeneration process. When operating in the combined mode, the switch Q10 is switched OFF and the duty cycle ton for switch Q7 can be set to allow for a sufficient amount of current to flow to the coil T1.

The foregoing discussion makes clear that the circuit can be operated in at least three modes: pulse braking mode, induction/inductive braking mode, and induction braking+ pulse braking mode.

Also disclosed herein is a fourth mode that shall be referred to a induction/inductive heating mode. This can be utilized with any of the above circuits.

In the cold start mode, consider a control unit (e.g., a line replaceable unit (LRU) control card at power up. In such case, if the LRU could is powered up at a cold temperature (e.g., −55 deg) with 115V 3-phase power, the LRU can be expected to have a degraded performance at start-up condition.

Figure 5:
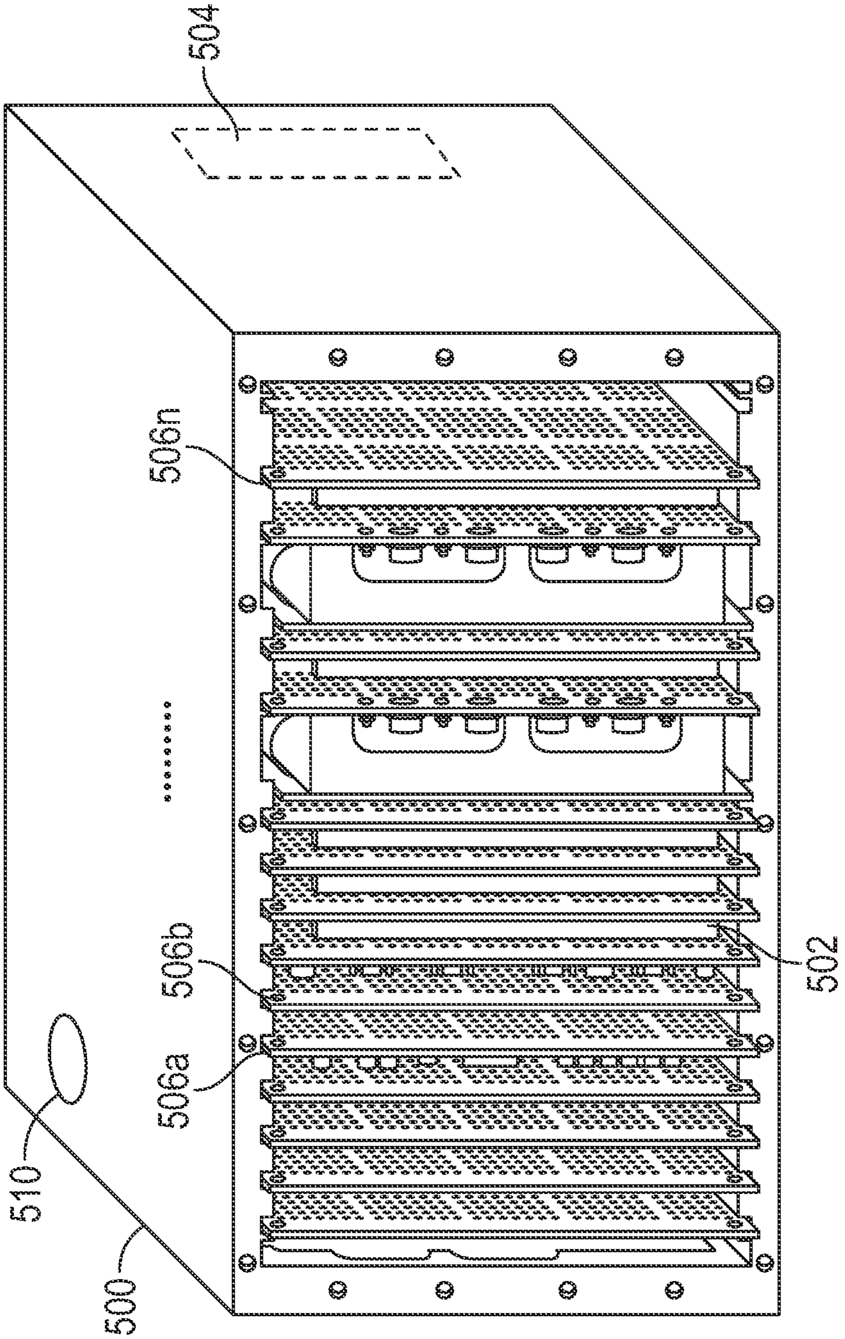
FIG. 5 shows a chassis into which LRU cards and a heater according to one embodiment can be loaded.

In any embodiment herein, T1 can implemented as an induction-based heater module 502. As shown, the induction-based heater module is implemented as an LRU (e.g., a PCB or other card) that can be inserted into a PCB chassis 500 (FIG. 5) or connected to a sidewall thereof (as indicated in the dashed box 504). Operation of T1 in the cold start mode will provide heat to adjacent PCB cards 506*a* . . . 506*n*.

Figure 6:
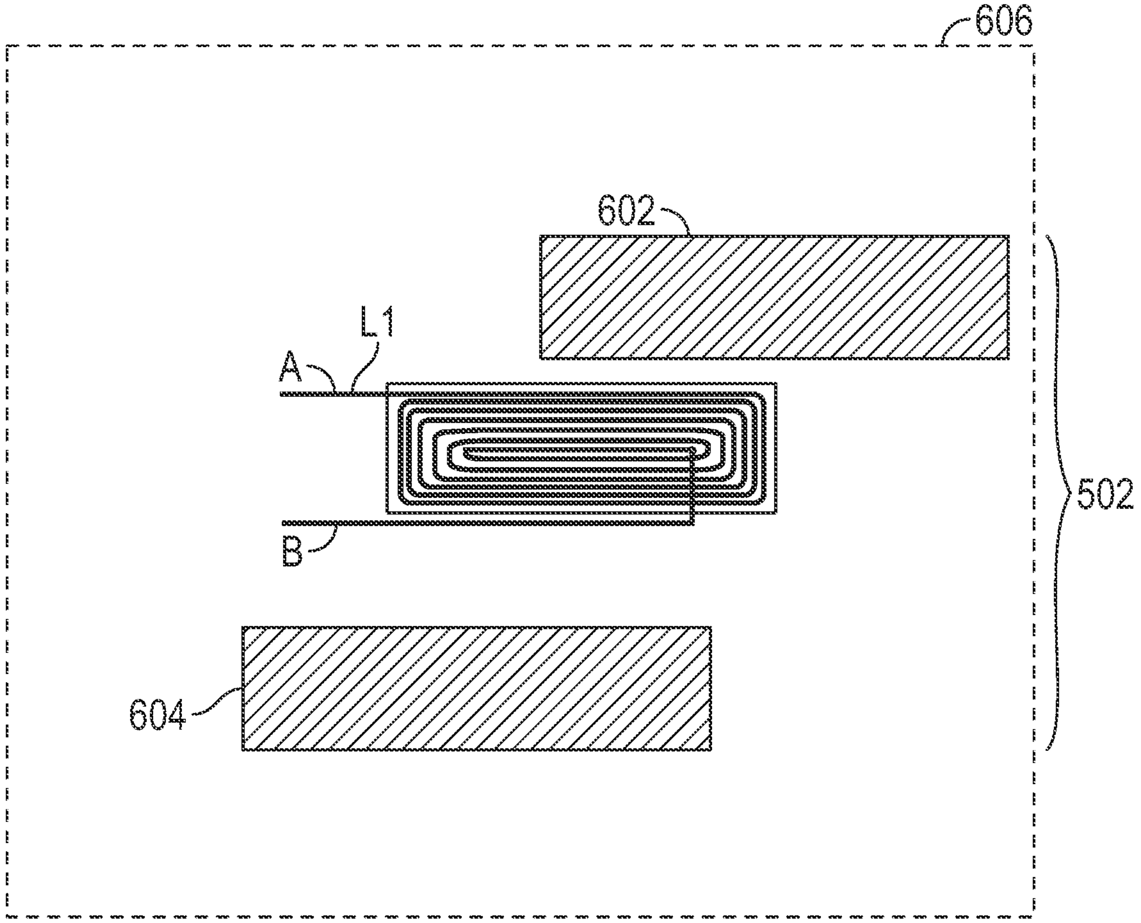
FIG. 6 shows an exploded view where the coil of the prior circuits is implemented as coil between ferrous plates.

As shown in FIG. 6, the induction-based heater module 502 can be formed by placing coil L1 between ferrous plates 602/604. L1 could be surrounded by an electrically insulating but magnetically conductive material to separate them from contact with the plates and still allow for inductive heating of the plates such that they operate as L3/Rload. The module 502 could be mounted on card 606 to facilitate insertion into the chassis 500.

The induction-based heater module 502 can be into or on the chassis 500 allows the heater to be mounted adjacent the other cards 506. Prior to start up (or at the same time), in the cold start mode power is used to provide power to the induction-based heater module 502. This results in the gradually heating of the induction-based heater module 502 and thus, heating of nearby PCBs. In some instances, a majority of heat transfer happens through back plane of the chassis to PCB surface. As noted above, alternatively, an induction-based heater module 502 can be mounted on a chassis wall as indicated by element 504.

During cold power-up the LRU temperature sensor 510 detect the temperature in the chassis 500 or of individual cards. If the temperature is to low, the circuits 1-4 above can be operated in an induction heating mode.

With reference to nay of the above circuits 100-400, in the cold start mode, Q8/Q7 can be sequentially turned on (i.e., Q8/Q7=switching 180° out of phase and ton and toff duty cycle can be varied for heating. IGBT Q9 is turned-on to provide lossless power in brake resistor for efficient induction heating. In the cold start mode, a DC bus voltage can be provided, for example, by an in aircraft or outside power supply and motor loads are disabled. As will be understood, the inclusion of L1 between one or more ferrous plates will result in heating of the plates due to an inductive heating process with the plates acting as L3/Rload. This can happen in any of the above embodiments.

The technical benefits and effects include implementing pulsed braking resistors and inductive braking which improves the efficiency of the electric drive. In addition, the braking systems herein can be used with power from other than motor to heat LRU components. These components could include, for example, motor controllers or any other LRU component.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A drive system for an aircraft, the system comprising:
a controller;
a motor configured to be driven by an H-bridge network;
a DC link that can be coupled to the motor; and
an electrical braking system configured to be electrically coupled to the motor, the electrical braking system comprising:
a sense circuit configured to sense a condition of the DC link;
a brake resistor coupled to the DC link;
a temperature sensor;
a drive circuit coupled to the sense circuit; and
a coil for breaking in an inductive braking mode or generating heat in a cold start mode, wherein the coil is located in or near a line replaceable unit chassis that includes printed circuit boards;
wherein the coil comprises an induction-based heater module formed by placing the coil between ferrous plates, wherein the induction-based heater module can be into or on the line replaceable unit chassis to allow the heater to be mounted adjacent the printed circuit boards, and wherein the inclusion of the coil between one or more ferrous plates will result in heating of the plates due to an inductive heating process to warm the printed circuit boards during cold start.

2. The system of claim 1, wherein the electrical braking system is configured to:
operate in a pulsed mode, wherein when in the pulsed mode a switch that is parallel with the brake resistor is switched OFF; and
control a first brake drive switch based on a configurable duty cycle.

3. The system of claim 1, wherein the electrical braking system is configured to operate in the inductive braking mode, wherein when in the inductive braking mode a switch that is parallel to the brake resistor is switched ON; and
wherein the system further includes a first brake drive switch and a second brake drive switch that are driven in a sequential fashion which allows current to flow to the coil.

4. The system of claim 1, wherein the electrical braking system is configured to:
operate in a combination pulsed braking and inductive braking mode;
switch a switch parallel to the brake resistor OFF; and
switch a first brake drive switch according to a configurable duty cycle to allow for pulsed braking and resonance regeneration.

5. The system of claim 1, wherein the sensed condition is a DC link voltage.

6. The system of claim 1, wherein the controller is configured to provide control signals including a pulse width modulation (PWM) signal.

7. The system of claim 1, wherein the sense circuit comprises a Zener diode configuration.

8. The system of claim 1, wherein the electrical braking system is configured in a star connected configuration.

9. The system of claim 1, wherein the ferrous plates act as a faraday cage to shield nearby elements from internally generated EMI.

10. A drive system for an aircraft, the system comprising:
a controller;
a motor configured to be driven by an H-bridge network;
a DC link that can be coupled to the motor; and
an electrical braking system configured to be electrically coupled to the motor, the electrical braking system comprising:
a sense circuit configured to sense a condition of the DC link;
a brake resistor coupled to the DC link;
a temperature sensor;
a drive circuit coupled to the sense circuit; and
a coil for breaking in an inductive braking mode or generating heat in a cold start mode, wherein the coil is located in or near a line replaceable unit chassis that includes printed circuit boards;
wherein the electrical braking system is configured to operate in the cold start mode when a temperature measured by the temperature sensor is below a threshold, wherein when in the cold start mode a switch that is parallel to the brake resistor is switched ON; and
wherein the system further includes a first brake drive switch and a second brake drive switch that are driven in a sequential fashion which allows current to flow to the coil; and
wherein the motor is decoupled from the DC link.

11. The system of claim 10, wherein the printed circuit boards include a controller for the motor.

12. The system of claim 10, wherein the sensed condition is a DC link voltage.

13. The system of claim 10, wherein the controller is configured to provide control signals including a pulse width modulation (PWM) signal.

14. The system of claim 10, wherein the sense circuit comprises a Zener diode configuration.

15. The system of claim 10, wherein the electrical braking system is configured in a star connected configuration.

16. The system of claim 10, wherein the coil is disposed between two plates.

17. A method of operating a drive system of an aircraft that includes:
a controller;
a motor configured to be driven by an H-bridge network;
a DC link that can be coupled to the motor; and
an electrical braking system configured to be electrically coupled to the motor, the electrical braking system comprising:
a sense circuit configured to sense a condition of the DC link;
a brake resistor coupled to the DC link;
a temperature sensor;
a drive circuit coupled to the sense circuit; and
a coil for breaking in an inductive braking mode or generating heat in a cold start mode, wherein the coil is located in or near a line replaceable unit chassis that includes printed circuit boards; and
a first brake drive switch and a second brake drive switch, the method comprising:
causing the electrical braking system to operate in the cold start mode when a temperature measured by the temperature sensor is below a threshold, wherein when in the cold start mode a switch that is parallel to the brake resistor is switched ON; and
driving the first brake drive switch and the second brake drive switch in a sequential fashion to allow current to flow to the coil; and
decoupling the motor from the DC link when operating in the cold start mode.

18. The method of claim 17, further comprising:
coupling the motor from the DC link;
causing the electrical braking system to operate in a pulsed mode, wherein when in the pulsed mode the switch that is parallel with the brake resistor is switched OFF; and
controlling the first brake drive switch based on a configurable duty cycle.

19. The method of claim 17, further comprising:
coupling the motor from the DC link;
causing the electrical braking system to operate in the inductive braking mode, wherein when in the inductive braking mode the switch that is parallel to the brake resistor is switched ON; and
driving the first brake drive switch and the second brake drive switch in a sequential fashion to allow current to flow to the coil.

* * * * *